United States Patent

[11] 3,603,987

[72] Inventor Robert A. Witte
      Playa Del Rey, Calif.
[21] Appl. No. 874,661
[22] Filed Nov. 6, 1969
[45] Patented Sept. 7, 1971
[73] Assignee International Telephone and Telegraph
      Corporation
      New York, N.Y.

[54] POLARIZATION DIVERSITY RADIATOR FOR PHASED ARRAYS
     7 Claims, 1 Drawing Fig.
[52] U.S. Cl. .................................................. 343/786,
                                                            343/852
[51] Int. Cl. ............................................ H01q 13/00
[50] Field of Search .................................... 343/756,
           777, 778, 783, 786, 850, 852, 853, 854

[56] References Cited
     UNITED STATES PATENTS
     2,942,261  6/1960  Jones et al. ................. 343/756
     3,458,862  7/1969  Franks ......................... 343/786

Primary Examiner—Eli Lieberman
Attorneys—C. Cornell Remsen, Jr., Walter J. Baum, Paul W. Hemminger, Percy P. Lantzy and Thomas E. Kristofferson ABSTRACT: A radiator of the open end (square) waveguide type, having diagonal ridges in its corners. An independent coaxial feed through the closed end of the waveguide provides excitation to each ridge. Opposite ridge pairs are excited together on a 0°/180° basis by hybrid circuits. Each of the two hybrid inputs then controls one opposite ridge pair as a unit. The inputs of the two hybrid circuits are controlled in relative phase by a two-bit digital phase shifter and hybrid ring circuit. The result is a polarization diversity capability with pulse-to-pulse controllability. The ridges are tuned by capacitance and inductance gaps at the feed end and matched at the aperture by quarter wave impedance transformers in the ridges.

PATENTED SEP 7 1971 3,603,987
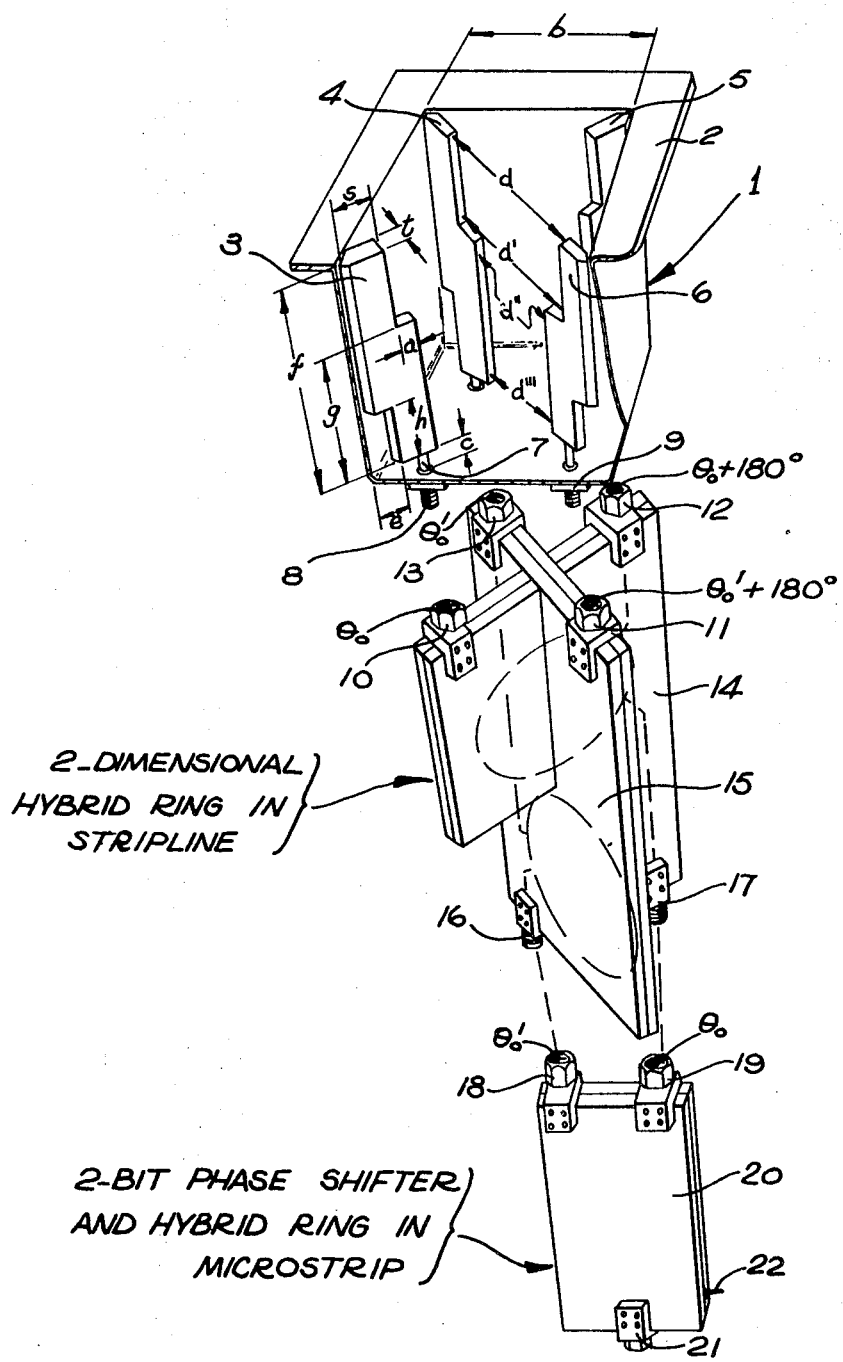
INVENTOR.
ROBERT A. WITTE
BY
William F. O'Neil
AGENT

POLARIZATION DIVERSITY RADIATOR FOR PHASED ARRAYS

BACKGROUND OF THE INVENTION

1. Field of the Invention

The invention relates to radar antennas and more particularly to antenna radiators capable of rapid electrically controlled polarization diversity.

2. Description of the Prior Art

In the prior art, polarization diversity has been accomplished for individual radiators or arrays of radiators in a number of mechanical and electrical ways. Among the mechanical systems is the provision of rotatable grating pairs in the near field. Such a system is describe in U.S. Pat. No. 2,930,040. A less flexible system for converting the polarization of a linear array form linear to circular is described in U.S. Pat. No. 2,800,657.

Electrical control of polarization may be said to require the phase control of radiation fields in each of two orthogonal physical dimensions in a plane normal to the direction of radiation. Inherently, some type of fast acting electrically controlled phase shifting device is required. In discussing prior art, U.S. Pat. No. 2,982,960 refers to the use of ferrite materials as the inductive elements of irises (with electrical control of the magnetization of the ferrites in a slotted wave guide radiator arrangement for that purpose.

Mechanical systems suffer the obvious disadvantage of slow reaction time so that polarization control in a pulse-to-pulse basis is out of the question. An electrically controlled slotted waveguide system is likely not to be adapted to inclusion in an array in which control of the polarization on an individual radiator basis is required. Electrically controlled systems, moreover, are not readily adaptable where a large number of radiators are to be included in a linear or two dimensional array, since the combination of the radiator, feed and RF phase (and sometimes amplitude) control devices constitutes a complex and bulky arrangement difficult to incorporate into an array requiring close-spaced radiating elements.

SUMMARY OF THE INVENTION

This specification describes a radiating element which has polarization diversity capability. An arbitrarily selected polarization may be selected on a pulse-to-pulse basis. That is to say, in a pulse radar the polarization could be controlled at a time to be one of a choice of vertical, horizontal right-hand circular or left-hand circular, and for the next pulse period could be switched to another of these polarizations.

The basic electrical logic upon which the invention is based is that this selection of polarizations may be accomplished by generating independent orthogonal polarizations of equal amplitude and adjustable relative phase. It will be appreciated as this invention is described, that any elliptical polarization can be formed by using appropriate phase shifting, however, for simplicity of description, the embodiment to be described in detail is one capable of horizontal, vertical and two circular polarizations as aforementioned.

In order to maintain the common phase center necessary to maintain phase coherence in the polarized radiated field, two orthogonal field vectors are generated in the same radiator. This radiator is an open end square waveguide with four corner ridges, each independently excited from an end launching coaxial feed arrangement. Opposite corner ridges are excited as pairs, so that the electric fields existing diagonally between ridges can add vectorially in the waveguide. The ridges of one diagonal pair may be thought of as being energized by energy of ($\theta_o$) and ($\theta_o+180°$) feed phase relationships. The other diagonal pair will then be energized by ($74_o'$) and ($\theta_o'+180°$). A two dimensional hybrid ring preferably of stripline construction to conserve space, supplies these phases relationships from two inputs of $\theta_o$ and $74_o'$. It is these latter two signals that, by their relative phase relationship, determine the polarization of the radiation. A two-bit digital phase shifter (i.e., one capable of $2^2$ states) and hybrid ring, preferably in microstrip, provides the $\theta_o$ and $\theta_o'$ signals from a single RF input of $\eta$ energy. A control input to this phase shifter then presets the $\theta_o$ and $\theta_o'$ phase relationship. This phase shifter is preferably of the digital latching type, but may be of a type responsive to a continuous discrete control-of-state signal (analog device).

The waveguide ridges act to lower the cutoff frequency of a square waveguide of given size. Thus, energy of a given wavelength will propagate down and be radiated from the open end of a ridged guide of smaller cross section than would be required without the ridges. This feature of the invention is important in that the radiator, although useable as an isolated radiator, was conceived as a radiating element for a close-spaced array and is especially useful in that application. Other features of the invention will be evident from the preferred embodiment description following.

BRIEF DESCRIPTION OF THE DRAWING

A single drawing FIGURE accompanying this specification, depicts in exploded isometric (partially cutaway), the elements of a typical embodiment of the radiator, phase-splitting hybrid ring, and phase shifter according to the present invention.

DESCRIPTION OF THE PREFERRED EMBODIMENT

Before undertaking the detailed description with references to the FIGURE, it is deemed desirable to briefly examine the effect of scanning array design on radiator spacing and therefore on radiator size.

In a typical phased (frequency scanning) array, the radiator spacing ($d_r$ for avoidance of grating lobes is defined as follows:

$$d_r \geq \frac{\lambda_{min}}{1+|\sin \theta_{max}|}$$

where $\lambda_{min}$ = wavelength at highest frequency in scan program
$\theta_{max}$ = maximum angle of scan referred to array normal (broadside)

In the limit as $\theta_{max}$ approaches 90°, $d_r$ becomes equal to or slightly less than one-half wavelength, allowing a safety factor for finite beam-widths. For less than $\lambda/2$ spacing of radiator elements, the square waveguide is limited to the same dimension on a side. As such, it would be below cutoff. To overcome this limitation, the unique corner ridge loading scheme was developed to lower the cutoff frequency of the waveguide. With respect to the field between each opposite pair of ridges, the other diagonal dimension of the square waveguide acts as an enlarged transverse dimension, making possible the propogation and radiation from the open end of the square waveguide of waves which would otherwise not propagate because of the aforementioned cutoff limitation.

Since there would be little or no allowable space between radiators, of the type herein described when assembled in an array, the end launching scheme for exciting the radiators is provided by a coaxial feed for each ridge through the back (closed) end of the waveguide body 1 (see FIGURE).

In the description of the complete device with respect to the FIGURE, the radiator itself will first be described.

The radiator body 1 is actually a length of square (cross section) waveguide fabricated form well-known thin conductive material. The said waveguide body 1 is closed at the feed end by a conductive bulkhead through which the typical coaxial connectors 8 and 9 are shown to extend. The open end, or aperture, is framed by a flange 2, which might actually be the plane surface of an array, including a number of these radiators. The four corner ridges within the body 1 will be seen to be 3, 4, 5, and 6. Inherently, there are two impedance adjustment problems in such a device. The first is the "tuning" of the load "seen" by each coaxial feed looking into the ridge which it excites. The second is that of matching the radiator aperture to free space. The first of these matching tasks is accomplished by adjustment of the combination of the ridge to back plate spacing $c$ and notch $h$ length and diagonal depth $e$ from the inside corner of the body 1, as shown The second impedance matching task is handled by the notch of depth $a$ and axial length approximately ($\lambda/4$) (in terms of wavelength within the guide measured from the aperture toward the back plate) provided in each of the ridges.

The actual design parameters of the entire device were empirically determined since this appeared to be the most economical technique. It is, of course, subject to "reverse engineering" analysis using rigorous methods.

The empirical design was undertaken realizing that a distributed capacitance exists between ridges and that the perimeter of the waveguide cross section appears as a distributed inductance. These parameters are related to cutoff frequency and characteristic impedance by the following equations:

$$Z_0 = \sqrt{\frac{L}{C}} \text{ and } f_0 = \frac{1}{2\pi\sqrt{LC}}$$

The matching problem of the coaxial input feed to the ridge waveguide is solved by tuning the resulting capacitance between the end of the ridge and back plate (dimension $c$, $t$ and $s$ being pertinent) and the inductance due to a coupling loop formed by dimensions $l$ and $h$. The ridge depth $s$ is given by $$s = \frac{\sqrt{2}b - d}{2}$$

where $d$ may be $d'$ or $d''$, depending upon the exact location of the transverse plane in which the said inside perimeter is being examined. Since the inductive parameter is related to this inside perimeter and therefore to $t$ and $s$, the turning effect of the capacitance at $c$ is interrelated in a complicated way because the said capacitance depends not only on the clearance $c$, but also on $t$ and $e$, since these affect the area of the end of the ridge facing the said back plate at $c$.

In order to clarify the invention and the typical dimensional relationships, Table I below has been included to list dimensions for a typical embodiment of the invention for use in the frequency range of 3.0 to 4.0 GHz. All Table I dimensions and tolerances are in inches.

TABLE I

| Physical Parameter | Dimension and Tolerance | |
|---|---|---|
| $a$ | 0.220 | ±0.002 |
| $b$ | 1.650 | ±0.002 |
| $c$ | 0.050 | ±0.002 |
| $d$ | 0.880 | ±0.002 |
| $d'$ | 0.805 | ±0.002 |
| $d''$ | 0.585 | ±0.002 |
| $d'''$ | 0.552 | ±0.002 |
| $e$ | 0.110 | ±0.003 |
| $f$ | 2.760 | ±0.004 |
| $g$ | 1.150 | ±0.004 |
| $h$ | 0.290 | ±0.003 |
| $t$ | 0.250 | ±0.002 |

The device built as described, and accordingly to the Table I dimensions, was tested and was found to provide at least 30 db. isolation between the orthogonal radiator feed pairs between approximately 3.0 and 3.8 GHz. Voltage standing wave ratios generally did not exceed 1.75 over that same frequency range. The device is thus relatively broad-banded and, accordingly, well adapted to use in a frequency scanning array.

Continuing the description with reference to the FIGURE, the center pin of the coaxial input 8 is illustrated at 7, and is typical of the other three inputs relating to ridges 4, 5, and 6. These coaxial feeds are symmetrically located and the pairs are typically spaced 1.340 ±0.003 inches diagonally in the embodiment built according to Table I. The particular coaxial connectors used were of a type known in the trade as 3 millimeter coaxial connectors and are typically for use in coaxial transmission circuits of 50 ohms characteristic impedance. Thus, the ridge notch design previously discussed is directed toward presentation of 50 ohms impedance (real) at each of the four inputs to the radiator.

Concerning the two-dimensional hybrid ring comprising 14 and 15, it is to be understood that these elements are readily constructed by persons skilled in this art from knowledge of performance requirements.

It will be apparent from the FIGURE that the 10 and 12 hybrid outputs mate with 8 and its diagonally o opposite connector on the radiator body. Similarly, 11 and 13 mate with 9 and its diagonal companion. Hybrid inputs 16 and 17 mate with 18 and 19, the phase shifter outputs $\theta_o'$ and $\theta_0$. The RF input to the system has already been referred to as $\theta$ and is applied at 21. Terminal 22 is intended as the digital control signal into 20. The nature of the 2-bit phase shifter and hybrid ring package 20 is also well known in the art and can be constructed by a person skilled in this art from performance requirements only.

II, depicts the typical performance 20 in a representative embodiment as herein described, as follows:

| Digital phase Shifter Control | $\theta_o'$ | Polarization of radiation |
|---|---|---|
| 00 | $\theta_o + 0$ | linear vertical |
| 01 | $\theta_o + 90°$ | right-hand circular |
| 10 | $\theta_o + 108°$ | linear horizontal |
|  | $\theta_o + 270°$ | left-hand circular |

An important feature of the radiator in this invention is the symmetry of the entire system. The two independent $TE_{10}$ modes generated between opposing ridge pairs are effectively isolated from each other over a fairly broad band of frequencies as previously indicated. Accurate construction of the two dimensional hybrid ring and the phase shifter is important in respect to isolation of these fields. That is, the outputs at 10 and 12 ($\theta_o$ and $\theta_o + 180°$) should be precisely 180° apart in phase and equal in power level. The same applies to $\theta_o'$ and $\theta_o' + 180°$ from terminals 13 and 11. The quality of linear and circular polarization radiation modes will, moreover, depend on the accuracy of the four phase relationships, $\theta_o'$ available at 18 (with respect to $\theta_o$ at 19), as well as on the physical symmetry of the radiator itself.

Obviously, when a number of radiators of the type described are to be assembled into a practical array, the economical manufacture of the individual radiators becomes a matter of great importance. The brazing, machining, and hand assembly methods of the model shop are therefore replaced by production techniques. For example, the radiator body with integral ridges is adapted to methods such as investment casting, or even die casting. The ridges have been designed with an internal taper to provide draft for just such an operation. In a hand made model of the radiator, no such taper was necessary, but the tuning notch details and certain other dimensions were slightly different in view of the interdependence of the various parameters as aforementioned. Draft or taper of the wall of body 1 may be accomplished externally (variable wall thickness) if required. The casting operation assumes that flange or array face 2 is subsequently attached.

In one embodiment, the radiators were formed as an accurately molded epoxy resin part with integral ridges, etc. A process for providing a conductive surface (necessary only inside) included processing steps of conditioning the epoxy surface for electroless plating, applying the electroless plating, copper electroplating to a predetermined thickness, and finally, the addition of a surface overcoating of electrolytic silver or other electrically and environmentally suitable metal.

The draft provided as indicated in the FIGURE is necessary to this type of process.

Numerous variations in the design are possible within the teachings of the invention described in a typical embodiment. The device may, of course, be suitably designed for operation in some other frequency band.

The drawings and description are illustrative and representative, but are not intended to limit the scope of the claims.

What I claim is:

1. An antenna radiating element for rapid control of the polarization of radiated energy, comprising:

a hollow conductive body comprising a length of square waveguide open at one end to form a radiating aperture, and closed at the opposite end;

four conductive ridges within said waveguide, one conductively fixed in each corner of said waveguide, said ridges each lying in a plane passing through the center of the square cross section of said waveguide;

a separate feed connected to each of said ridges through said opposite end of said conductive body; phase splitting means for energizing opposite pairs of said ridges in 180° phase relationship through said ridge feeds;

and means for controlling the relative phase of energy exciting each of said pairs of ridges with respect to the other pair, thereby to control the polarization of energy propagated by said waveguide and radiated from said open end.

2. The invention set forth in claim 1 in which said ridges extend lengthwise in their respective corners substantially from said open end to the closed end of said square waveguide within a predetermined first air gap, and further, each of said ridges includes a second air gap in the form of an undercut for a portion of its length measured from said first air gap, said second air gap being between each ridge and the corresponding corner of said waveguide.

3. The invention set forth in claim 2 in which the relative sizes of said first and second air gaps are apportioned so that their effects on capacitance and inductance, respectively, as effective at the points of said feeds, tend to be compensatory, thereby to effect tuning of said feeds.

4. The invention set forth in claim 1 further defined in that said ridges each include a matching cut, such as to increase the diagonal clearance within the waveguide between opposite ridges for a distance measured along the length of said ridges from said open end, said distance being substantially equal to an electrical quarter wavelength within said guide.

5. The invention set forth in claim 1 further defined in that said phase splitting means for energizing opposite pairs of said ridges in 180° phase relationship includes a pair of hybrid rings, one for each of said opposite pairs of ridges, each of said hybrid rings having an input and $\theta$ phase and $\theta+180°$ outputs.

6. The invention defined in claim 5, in which said means for controlling the relative phase of energy exciting each of said pairs of ridges includes a phase shifter having one radio frequency input, two outputs, which are connected to the inputs of said phase splitting means, and a control input, said phase shifter providing signals at its outputs different in phase by an amount variable between zero and 360° in response to corresponding signals at said control input.

7. The invention set forth in claim 6 in which said phase shifter is defined as a 2-bit digitally controlled device, whereby the phase difference between said phase shifter outputs is controlled to be 0°, 90°, 180°, or 270° corresponding to the four control conditions provided by a 2-bit digital control signal.